(12) United States Patent
Olen

(10) Patent No.: US 10,889,989 B1
(45) Date of Patent: Jan. 12, 2021

(54) ROOF MONITORING SYSTEM

(71) Applicant: Adam Olen, Duvall, WA (US)

(72) Inventor: Adam Olen, Duvall, WA (US)

(73) Assignee: V2T IP, LLC, Charlotte, NC (US)

( * ) Notice: Subject to any disclaimer, the term of this patent is extended or adjusted under 35 U.S.C. 154(b) by 38 days.

(21) Appl. No.: 16/241,554

(22) Filed: Jan. 7, 2019

(51) Int. Cl.
*E04D 13/17* (2006.01)
*E04D 13/00* (2006.01)
*G01N 27/20* (2006.01)
*G01L 1/00* (2006.01)

(52) U.S. Cl.
CPC ........ *E04D 13/006* (2013.01); *G01N 27/20* (2013.01); *G01L 1/005* (2013.01)

(58) Field of Classification Search
CPC ...... G08B 5/36; G08B 21/182; E04D 13/006; E04D 13/17; E04D 5/14; G01N 27/20; G01L 1/005; G01L 1/26; G01M 5/0025
See application file for complete search history.

(56) References Cited

U.S. PATENT DOCUMENTS

| | | | |
|---|---|---|---|
| 5,598,273 A | 1/1997 | Kurisaki et al. | |
| 5,818,340 A | 10/1998 | Yankielun et al. | |
| 6,104,298 A | 8/2000 | Flanders | |
| 6,225,909 B1 * | 5/2001 | Nill, Jr. | E04D 13/006 340/602 |
| 7,001,266 B2 | 2/2006 | Jones et al. | |
| 7,607,974 B2 | 10/2009 | Jones et al. | |
| 8,101,904 B2 | 1/2012 | Torres-Jara | |
| 8,106,769 B1 | 1/2012 | Maroney et al. | |
| RE43,653 E | 9/2012 | Lin | |
| 8,618,934 B2 | 12/2013 | Belov et al. | |
| 9,244,030 B2 | 1/2016 | Vokey et al. | |
| D753,524 S | 4/2016 | Beldon | |
| D781,163 S | 3/2017 | Beldon | |
| 9,829,396 B2 | 11/2017 | Ayon et al. | |
| 10,571,141 B1 * | 2/2020 | Gray | F24F 11/0001 |
| 2004/0235411 A1 * | 11/2004 | Jones | E04D 13/17 454/367 |
| 2005/0054281 A1 * | 3/2005 | Lin | F24F 7/02 454/116 |
| 2006/0005479 A1 * | 1/2006 | Jones | E04D 13/17 52/199 |
| 2012/0118649 A1 * | 5/2012 | Clark | G01G 23/3735 177/211 |
| 2014/0260687 A1 | 9/2014 | Beldon | |
| 2015/0269830 A1 * | 9/2015 | Beldon | G08B 5/36 340/666 |

* cited by examiner

*Primary Examiner* — Lee E Rodak
*Assistant Examiner* — Brent J Andrews
(74) *Attorney, Agent, or Firm* — Bryan L. Loeffler, Esq.; Loeffler IP Group, PA

(57) ABSTRACT

A roof monitoring system for flat and low slope roofs having a membrane (10) applied over an underlying support structure or subroof (11) wherein air passing between the membrane and the subroof passes through a vent (1) having sensors (12) located therein to collect data.

19 Claims, 3 Drawing Sheets

ROOF MONITORING SYSTEM

FIELD OF THE INVENTION

This invention relates to leak detection systems for roofs and more particularly a roof monitoring system for flat and low slope roofs having a membrane applied over an underlying support structure or subroof wherein air passing between the membrane and the underlying support structure is monitored to detect possible leaks in the roof.

BACKGROUND OF THE INVENTION

The failure to detect, find and correct minor roof deterioration in the earliest stages is considered the greatest cause of premature roof failure. This is particularly true of roofing materials applied on low-slope or flat roofs. Costly roofing problems are often the result of undetected damage and/or resulting leaks. Even when properly designed and applied, all roofing materials deteriorate from exposure to the weather at rates determined largely by the kind of material, exposure to environmental conditions and damage from exposure to foreign objects.

Therefore, a need exists for a roof monitoring system for flat and low slope roofs having a membrane applied over an underlying support structure or subroof wherein air passing between the membrane and the underlying support structure is monitored to detect possible leaks in the roof.

SUMMARY OF THE INVENTION

The primary object of the present invention is to provide a roof monitoring system for flat and low slope roofs having a membrane applied over an underlying support structure or subroof wherein air passing between the membrane and the underlying support structure is monitored to detect possible leaks in the roof.

The present invention fulfills the above and other objects by providing a system comprising a roof vent having a housing having an open bottom that is securable to a roof membrane via a flange in a manner that allows air from under the roof membrane to travel through the housing of the roof vent having one or more sensors to measure and monitor wind flow, humidity, temperature, pressure, moisture and so forth passing through a roof vent. The sensors are preferably housed within a roof vent used to fasten a membrane to a subroof. The roof vent is preferably a domed vent system that induces a Venturi effect when wind blows through the structure of the vent or similar vent that vents air from between a membrane and subroof. The vent has a port that is open to a space under a roof membrane. When wind blows through the roof vent, low pressure is created at the port by the Venturi effect and the low pressure is applied to the space under the membrane, thereby drawing air from under the membrane.

One or more sensors are located in the roof vent to monitor the air as it passes through the vent. The sensors may be hard wired and/or wirelessly connected to a receiver and cloud storage for storing data.

The sensors may monitor and measure wind flow, humidity levels, temperature, pressure, and so forth. This data may then be used to detect leaks, detect changes in moisture levels, detect changes in humidity levels, determine downward pressure forces on the roof from things such as snowfall, quantify moisture removal capacities of vents, monitor defects and/or failures in the vents and so forth. For example, a change in pressure may indicate the presence of a tear in the membrane and thus loss of a full air seal. In such a case, the sensors serve as an early warning system for potential problems and potential leaks.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
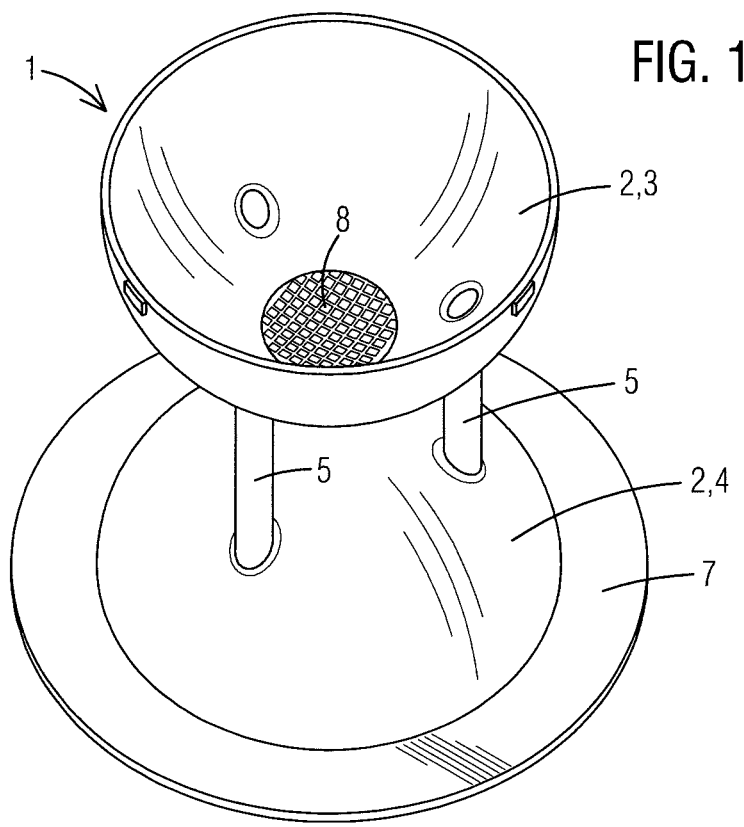
FIG. 1 is a perspective top view of a roof vent of the present invention having a lid removed.
Figure 2:
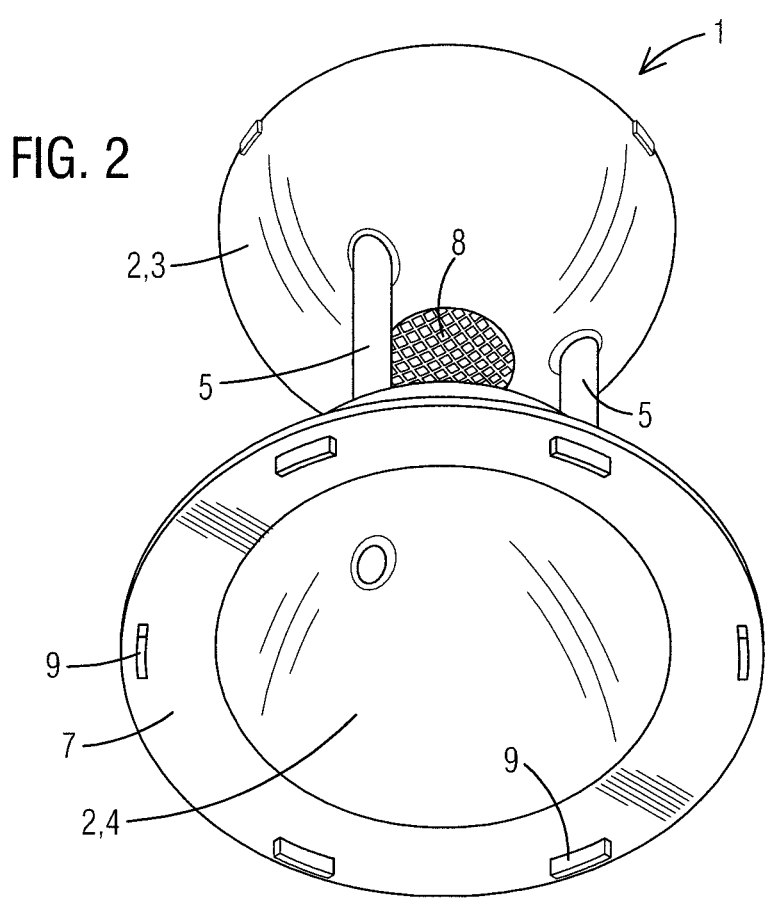
FIG. 2 is a perspective bottom view of a roof vent of the present invention having a lid removed.
Figure 3:
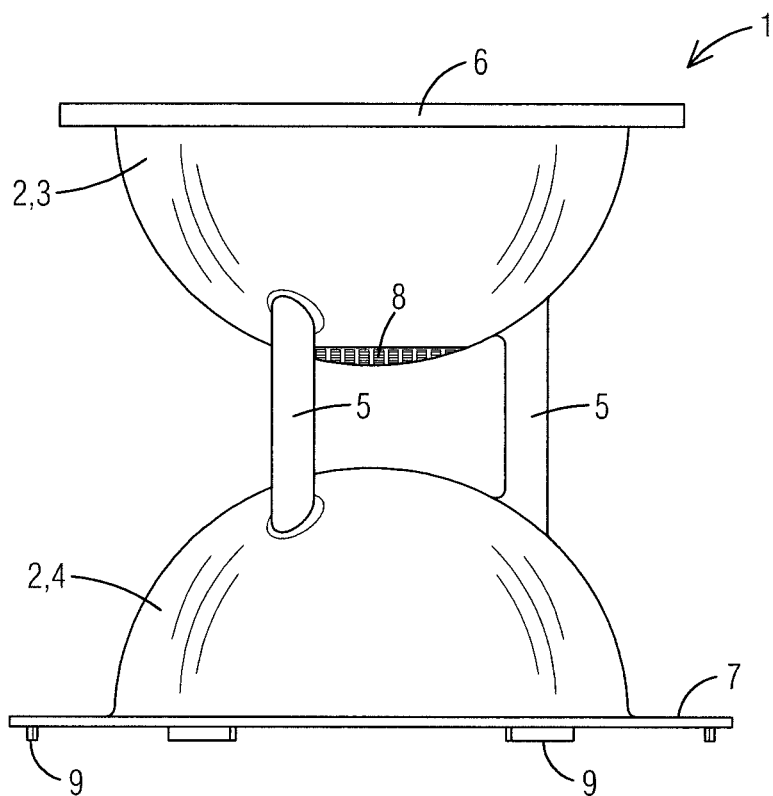
FIG. 3 is a side view of a roof vent and lid of the present invention.

For purposes of describing the preferred embodiment, the terminology used in reference to the numbered accessories in the drawings is as follows:

1. roof vent, generally
2. housing
3. upper dome
4. lower dome
5. leg
6. removable lid
7. horizontal flange
8. port
9. spacer
10. roof membrane
11. subroof
12. sensor
1201. humidity sensor
1202. pressure sensor
1203. temperature sensor
1204. wind speed sensor
13. network receiver
14. data appliance
15. data base
16. access panel With reference to FIGS. 1-3, a roof vent 1 of the present invention is illustrated. The roof vent 1 comprises a housing 2. As illustrated herein the housing comprises an upper dome 3, a lower dome 4 and legs 5. Legs 5 support the upper dome 3 above the lower dome 4. The upper dome 3 is preferably closed on the top by a removable lid 6 to prevent rainwater from collecting in the upper dome 3. The lower dome 4 preferably has a horizontal flange 7 for attachment to a roof membrane 10, as illustrated in FIG. 4.

Figure 4:
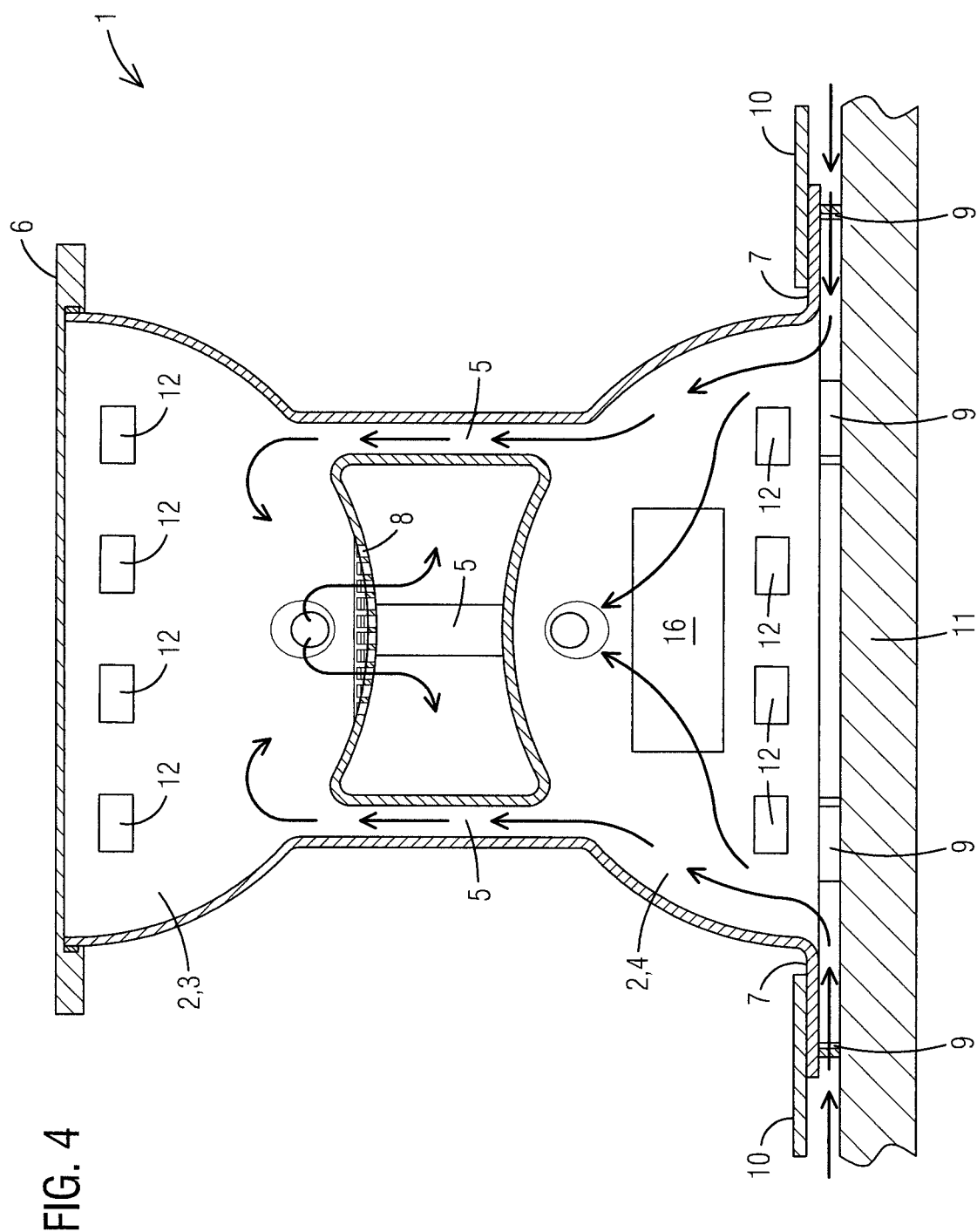
FIG. 4 is a sectional side view of a roof vent of the present invention in combination with a roof membrane and subroof.

With reference to FIG. 4, a sectional side view of a roof vent 1 of the present invention in combination with a roof membrane 10 and subroof 11 is illustrated. The roof vent 1 comprises a housing 2 having an upper dome 3, a lower dome 4 and legs 5. Tubular-shaped legs 5 support the upper dome 3 above the lower dome 4 and allow air to pass through the vent 1. The upper dome 3 is preferably closed on the top by a removable lid 6 that provide access. The lower dome 4 of the housing 2 preferably has a horizontal flange 7 with spacers 9 for securing the housing 2 between the roof membrane 10 and the subroof 11. The housing 2 has an open bottom located on the lower dome 2 to allow air to pass from under the membrane 9 and through the housing 2. Both the housing 2 and upper dome 3 and lower dome 4 thereof are preferably hollow, thereby allowing air to pass thorough and providing a space to mount one or more sensors 12.

As illustrated herein, the upper dome 3 comprises at least one port 8 located at a point closest to the lower dome 4. The legs 5 are hollow to allow air from underneath the roof membrane 10 to travel though the lower dome 4, through the legs 5, through the upper dome 3 and out of the at least one port 8. Alternatively, the lower dome 4 may have a port 8 located at the point closest to the upper dome 3. One or more sensors 12 are located within the lower dome 4 and/or the upper dome 3. If the one or more sensors 12 are located in the lower dome 4, then they may be accessed via a removable access panel 16.

Figure 5:
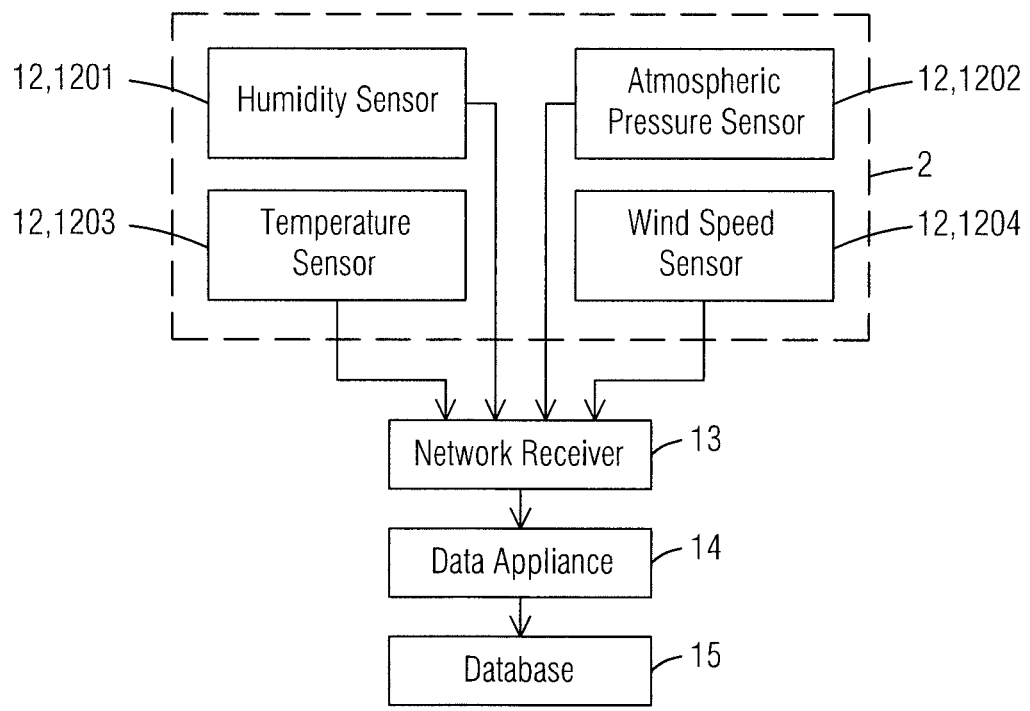
FIG. 5 is a block diagram of showing multiple sensors located within a roof vent of the present invention and connected to a server.

With reference to FIG. 5, a block diagram showing multiple sensors located within a roof vent of the present invention and connected to a server is illustrated. The roof vent 1 of the present invention houses at least one sensor 12. The sensors 12 may include at least one humidity sensor 1201, at least one pressure sensor 1202, at least one temperature sensor 1203, at least one wind speed sensor 1204 and so forth.

The at least one humidity sensor 1201 may measure humidity under membrane and humidity in the ambient air in order to provide a comparison of the two. The at least one humidity sensor 1201 may also be used in multiple vents to compare humidity levels at different locations on the roof. The at least one humidity sensor 1201 in combination with the at least one wind speed sensor 1204 may also measure the rate at which moisture is pulled out from under the membrane as a function of wind velocity.

At least one sensor 12 may be mounted outside of the housing 2 to provide a weather station for measuring wind speed, temperature, humidity, barometric pressure and so forth to be used in data collection and for comparison to air moving under the membrane.

The at least one pressure sensor 1202 may measure weight on the roof within an immediate vicinity of the vent 1. In addition, the at least one pressure sensor 1202 may measure an amount of negative pressure under the membrane caused from wind passing over roof, which can indicate a tear in the membrane.

The at least one temperature sensor 1204 may measure the ambient air temperature, the temperature of the air exiting from under the membrane, wind chill and/or differences which may give rise to condensation, expansion, contraction and so forth.

The at least one wind speed sensor 1204 may measure the speed of wind passing through or over the vent.

An exemplary monitoring architecture comprises at least one sensor 12 connected to a network receiver 13 or sink, connected to a data appliance 14, which is connected to at least one database 15. The components of the present system may be wirelessly connected and/or hard wired wherein wires may be locate under the membrane 10. The database 15 is preferably a cloud storage connected to the system via the Internet, cellular and so forth and accessible by one or more accounts.

Multiple sensors 12 may utilize a sleeping mesh networking technology allowing for real world placement of roof vents 1 and integrated sensors 12 in remote locations of a roof without access to a line-powered router. The sensors 12 may be placed in such a manner that develops redundant network pathways.

Data transferred through the system is preferably encrypted. Sensor 12 may be set to collect data in real time or at set times. The collection of data by the at least one sensor 12 allows the system to create alerts based on inconsistencies in the data or if preset thresholds are exceeded or not met. Alerts may also be created to flag system faults, thereby reducing any system downtime caused by malfunctions and/or failures within the system. For example, if communication is interrupted from either the data appliance 14 or from an individual sensor 12, a notification would go to one or more designated users having an access account to the system. Alerts may be communicated via an automated notification, such as through an online application, text, email and so forth.

The data appliance 14 is capable of coordinating and controlling a wireless network, coordinating and controlling with the at least one database 15 and temporarily housing data collected by the at least one sensor 12.

The collected data is preferably accessible via a web based application to track environmental data that is collected by the at least one sensor 12.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A roof monitoring system comprising:
a roof vent having a housing;
said housing having an upper dome connected to a lower dome by at least two hollow legs connecting an interior space of the upper dome to an interior space of the lower dome so that air is capable of move freely though out the housing;
said lower dome having an open bottom that is securable to a roof membrane via a flange that extends outward from a lower perimeter of the lower dome and allows air from under the roof membrane to enter the lower dome, travel through the at least two hollow legs and into the upper dome of the housing of the roof vent; and
at least one sensor located inside the housing in a position that allows air flowing through the housing to make direct contact with the at least one sensor; and
said at least one sensor capable of collecting data from air passing through the lower dome, at least two hollow legs, and the upper dome of the housing.

2. The roof monitoring system of claim 1 wherein: said at least one sensor is a humidity sensor positioned within the housing to be capable of measuring an amount of humidity in air passing from under the roof membrane and through the housing.

3. The roof monitoring system of claim 1 wherein: said at least one sensor is a pressure sensor positioned within the housing to be capable of detecting unwanted openings in the roof membrane by measuring an amount of negative pressure in air passing from under the roof membrane and through the housing.

4. The roof monitoring system of claim 1 wherein: said at least one sensor is a wind speed sensor positioned within the housing to be capable of detecting unwanted openings in the roof membrane by measuring speeds of air passing from under the roof membrane and through the housing.

5. The roof monitoring system of claim 1 wherein: said at least one sensor is a temperature sensor positioned within the housing to be capable of measuring a temperature of air passing from under the roof membrane and through the housing to acquire a temperature of the roof.

6. The roof monitoring system of claim 1 further comprising: a data appliance connected to the at least one sensor.

7. The roof monitoring system of claim 1 further comprising: a database connected to the at least one sensor.

8. A roof monitoring system comprising:
a roof vent having a housing;
said housing having an upper dome connected to a lower dome by at least two hollow legs connecting an interior space of the upper dome to an interior space of the lower dome so that air is capable of move freely though out the housing; said lower dome having an open bottom that is securable to a roof membrane via a flange that extends outward from a lower perimeter of the lower dome and allows air from under the roof membrane to enter the lower dome, travel through the at least two hollow tubes legs and into the upper dome of the housing of the roof vent; and
a humidity sensor located inside the housing in a position that allows air flowing through the lower dome, at least one hollow leg and upper dome to make contact with the humidity sensor;
said humidity sensor capable of collecting data from air passing through the lower dome, at least two hollow legs, and the upper dome of the housing; and said humidity sensor positioned within the housing to be capable of detecting humidity in air passing from under the roof membrane and through the housing.

9. The roof monitoring system of claim 8 further comprising: a pressure sensor positioned within the housing to be capable of detecting unwanted openings in the roof membrane by measuring an amount of negative pressure in air passing from under the roof membrane and through the housing.

10. The roof monitoring system of claim 8 further comprising: a wind speed sensor positioned within the housing to be capable of detecting unwanted openings in the roof membrane by measuring speeds of air passing from under the roof membrane and through the housing.

11. The roof monitoring system of claim 8 further comprising: a temperature sensor positioned within the housing to be capable of measuring a temperature of air passing from under the roof membrane and through the housing to acquire a temperature of the roof.

12. The roof monitoring system of claim 8 further comprising: a data appliance connected to the at least one sensor.

13. The roof monitoring system of claim 8 further comprising: a database connected to the at least one sensor.

14. A roof monitoring system comprising:
a roof vent having a housing;
said housing having an upper dome connected to a lower dome by at least two hollow legs connecting an interior space of the upper dome to an interior space of the lower dome so that air is capable of move freely though out the housing;
said lower dome having an open bottom that is securable to a roof membrane via a flange that extends outward from a lower perimeter of the lower dome and allows air from under the roof membrane to enter the lower dome, travel through the at least two hollow legs and into the upper dome of the housing of the roof vent; and
a pressure sensor located inside the housing in a position that allows air flowing through the lower dome, at least one hollow leg and upper dome to make contact with the pressure sensor;
said pressure sensor capable of collecting data from air passing through the lower dome, at least two hollow legs, and the upper dome of the housing; and said pressure sensor positioned within the housing to be capable of detecting unwanted openings in the roof membrane by measuring an amount of negative pressure in air passing from under the roof membrane and through the housing.

15. The roof monitoring system of claim 14 further comprising: a humidity sensor positioned within the housing to be capable of detecting humidity in air passing from under the roof membrane and through the housing.

16. The roof monitoring system of claim 14 further comprising: a temperature sensor positioned within the housing to be capable of measuring a temperature of air passing from under the roof membrane and through the housing to acquire a temperature of the roof.

17. The roof monitoring system of claim 14 further comprising: a temperature sensor positioned within the housing to be capable of measuring a temperature of air passing from under the roof membrane and through the housing to acquire a temperature of the roof.

18. The roof monitoring system of claim 14 further comprising: a data appliance connected to the at least one sensor.

19. The roof monitoring system of claim 14 further comprising: a database connected to the at least one sensor.

* * * * *